(12) United States Patent
Griffin et al.

(10) Patent No.: US 7,952,571 B2
(45) Date of Patent: *May 31, 2011

(54) HAND-HELD ELECTRONIC DEVICE WITH MULTIPLE INPUT MODE THUMBWHEEL

(75) Inventors: Jason T. Griffin, Waterloo (CA); Chao Chen, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/636,192

(22) Filed: Dec. 11, 2009

(65) Prior Publication Data

US 2010/0090990 A1 Apr. 15, 2010

Related U.S. Application Data

(63) Continuation of application No. 12/354,674, filed on Jan. 15, 2009, now Pat. No. 7,639,241, which is a continuation of application No. 11/950,234, filed on Dec. 4, 2007, now Pat. No. 7,495,660, which is a continuation of application No. 10/997,340, filed on Nov. 24, 2004, now Pat. No. 7,319,461, which is a continuation of application No. 10/038,314, filed on Oct. 19, 2001, now Pat. No. 6,842,169.

(51) Int. Cl.
*G06F 3/033* (2006.01)
*G09G 5/00* (2006.01)
(52) U.S. Cl. ........................................ 345/184; 345/169
(58) Field of Classification Search .................. 345/156, 345/157, 163–169, 184
See application file for complete search history.

(56) References Cited

U.S. PATENT DOCUMENTS

| 4,029,915 | A | | 6/1977 | Ojima | |
|---|---|---|---|---|---|
| 4,449,839 | A | | 5/1984 | Bleuer | |
| D278,341 | S | | 4/1985 | Scheid | |
| 4,625,557 | A | * | 12/1986 | Rutherford | ..................... 73/635 |
| D293,241 | S | | 12/1987 | Wan et al. | |
| RE32,686 | E | * | 5/1988 | Dages | ......................... 455/182.1 |
| D312,628 | S | | 12/1990 | Yokoi et al. | |
| D313,401 | S | | 1/1991 | Tanabe | |
| D313,413 | S | | 1/1991 | Langton | |
| 5,059,048 | A | | 10/1991 | Sirkin | |

(Continued)

FOREIGN PATENT DOCUMENTS

EP 0267801 A2 5/1988

(Continued)

OTHER PUBLICATIONS

"Triangular Toggle Keys for Touch-Tone Phones"; IBM Technical Disclosure Bulletin, vol. 31, No. 1, Jun. 1, 1988, p. 47-49, NY, US.
"Programmable Calculators: Hewlett-Packard HP-200LX," Viktor T. Toth, copyr. 2001, 2002, from web page at www.rskey.org/hp200lx.html.

*Primary Examiner* — Ricardo L Osorio
(74) *Attorney, Agent, or Firm* — Finnegan, Henderson, Farabow, Garrett & Dunner LLP

(57) ABSTRACT

A thumbwheel input device oriented on an incline and comprising a wheel such that a first input is generated by rotation of the wheel about its axis, and a holder also having an axis of rotation and a portion thereon to receive the wheel whereby a second input is generated by rotation of the holder about the second axis.

20 Claims, 8 Drawing Sheets

U.S. PATENT DOCUMENTS

| | | | |
|---|---|---|---|
| 5,184,830 A | 2/1993 | Okada et al. | |
| 5,217,295 A | 6/1993 | Tortola et al. | |
| 5,288,158 A | 2/1994 | Matias | |
| D345,158 S | 3/1994 | Namba et al. | |
| 5,336,001 A | 8/1994 | Lichtenberg | |
| 5,337,346 A | 8/1994 | Uchikura | |
| 5,360,280 A | 11/1994 | Camacho et al. | |
| 5,367,298 A | 11/1994 | Axhelm | |
| D357,253 S | 4/1995 | Wong | |
| 5,410,141 A | 4/1995 | Koenck et al. | |
| 5,410,333 A | 4/1995 | Conway | |
| 5,426,449 A | 6/1995 | Danziger | |
| D359,920 S | 7/1995 | Sakamoto | |
| 5,436,954 A | 7/1995 | Nishiyama et al. | |
| 5,436,960 A | 7/1995 | Campana, Jr. et al. | |
| 5,457,454 A | 10/1995 | Sugano | |
| D367,043 S | 2/1996 | Ross et al. | |
| 5,500,643 A | 3/1996 | Grant | |
| 5,543,787 A | 8/1996 | Karidis et al. | |
| 5,563,631 A | 10/1996 | Masunaga | |
| 5,575,576 A | 11/1996 | Roysden, Jr. | |
| 5,600,790 A | 2/1997 | Barnstijin et al. | |
| 5,606,712 A | 2/1997 | Hikada | |
| 5,611,031 A | 3/1997 | Hertzfeld et al. | |
| D381,021 S | 7/1997 | Williams et al. | |
| D383,756 S | 9/1997 | Henderson et al. | |
| 5,666,138 A * | 9/1997 | Culver | 345/161 |
| 5,672,108 A | 9/1997 | Lam et al. | |
| D386,497 S | 11/1997 | Huslig et al. | |
| 5,689,253 A | 11/1997 | Hargreaves et al. | |
| D390,509 S | 2/1998 | Antzinas et al. | |
| 5,737,394 A | 4/1998 | Anderson et al. | |
| 5,786,776 A | 7/1998 | Kisaichi et al. | |
| D397,369 S | 8/1998 | Rissman | |
| 5,797,089 A | 8/1998 | Nguyen | |
| D397,728 S | 9/1998 | Yuen et al. | |
| D399,537 S | 10/1998 | Chi et al. | |
| 5,818,437 A | 10/1998 | Grover et al. | |
| 5,825,353 A | 10/1998 | Will | |
| 5,827,082 A | 10/1998 | Laine | |
| D402,572 S | 12/1998 | Han | |
| D403,362 S | 12/1998 | Fai | |
| 5,861,821 A | 1/1999 | Kato et al. | |
| 5,893,798 A | 4/1999 | Stambolic et al. | |
| 5,912,661 A * | 6/1999 | Siddiqui | 345/166 |
| 5,915,228 A | 6/1999 | Kunihiro et al. | |
| 5,920,308 A | 7/1999 | Kim | |
| 5,930,703 A | 7/1999 | Cairns | |
| 5,931,873 A | 8/1999 | Cisar | |
| 5,963,197 A | 10/1999 | Bacon et al. | |
| 5,966,098 A | 10/1999 | Qi et al. | |
| 5,974,238 A | 10/1999 | Chase, Jr. | |
| D416,024 S | 11/1999 | Johansson et al. | |
| D416,256 S | 11/1999 | Griffin et al. | |
| 5,982,520 A | 11/1999 | Weiser et al. | |
| 5,995,026 A | 11/1999 | Sellers et al. | |
| 6,005,496 A | 12/1999 | Hargreaves et al. | |
| 6,006,351 A | 12/1999 | Peretz et al. | |
| 6,009,333 A | 12/1999 | Chaco | |
| 6,014,429 A | 1/2000 | LaPorta et al. | |
| 6,014,573 A | 1/2000 | Lehtonen et al. | |
| 6,018,651 A | 1/2000 | Bruckert et al. | |
| D420,351 S | 2/2000 | Waldner | |
| 6,023,779 A | 2/2000 | Fullam et al. | |
| 6,046,730 A | 4/2000 | Bowen et al. | |
| 6,046,732 A | 4/2000 | Nishimoto | |
| 6,047,047 A | 4/2000 | Aldridge et al. | |
| 6,047,196 A | 4/2000 | Makela et al. | |
| 6,047,197 A | 4/2000 | Jerrad | |
| 6,049,796 A | 4/2000 | Siitonen et al. | |
| 6,052,070 A | 4/2000 | Kivela et al. | |
| 6,084,576 A | 7/2000 | Leu et al. | |
| 6,091,956 A | 7/2000 | Hollenberg et al. | |
| 6,094,197 A | 7/2000 | Buxton et al. | |
| 6,102,594 A | 8/2000 | Strom | |
| 6,103,979 A | 8/2000 | Motoyama et al. | |
| 6,107,997 A | 8/2000 | Ure et al. | |
| D432,511 S | 10/2000 | Eckholm | |
| D433,017 S | 10/2000 | Martinez | |
| D433,460 S | 11/2000 | Griffin et al. | |
| 6,148,261 A | 11/2000 | Obradovich et al. | |
| 6,157,323 A | 12/2000 | Tso et al. | |
| D436,591 S | 1/2001 | Abston et al. | |
| 6,212,412 B1 | 4/2001 | Rogers et al. | |
| D441,733 S | 5/2001 | Do et al. | |
| 6,243,789 B1 | 6/2001 | Hasbun et al. | |
| 6,256,011 B1 * | 7/2001 | Culver | 345/157 |
| 6,278,442 B1 | 8/2001 | Griffin et al. | |
| 6,295,052 B1 | 9/2001 | Kato et al. | |
| 6,297,795 B1 | 10/2001 | Kato et al. | |
| 6,304,431 B1 | 10/2001 | Kim | |
| 6,310,609 B1 | 10/2001 | Morgenthaler | |
| D451,079 S | 11/2001 | Ali | |
| D454,349 S | 3/2002 | Makidera et al. | |
| D454,849 S | 3/2002 | Eckholm | |
| 6,356,258 B1 | 3/2002 | Kato et al. | |
| 6,374,277 B2 | 4/2002 | Vong et al. | |
| D456,794 S | 5/2002 | Laverick et al. | |
| 6,385,463 B1 | 5/2002 | Lieberman et al. | |
| 6,396,482 B1 | 5/2002 | Griffin et al. | |
| D458,239 S | 6/2002 | Shim et al. | |
| D459,327 S | 6/2002 | Ali | |
| D460,068 S | 7/2002 | Lanzaro et al. | |
| D460,493 S | 7/2002 | Griffin et al. | |
| D461,803 S | 8/2002 | Griffin et al. | |
| 6,452,588 B2 | 9/2002 | Griffin et al. | |
| D464,995 S | 10/2002 | Griffin et al. | |
| 6,459,968 B1 | 10/2002 | Kochie | |
| D467,917 S | 12/2002 | Tischer | |
| 6,489,950 B1 | 12/2002 | Griffin et al. | |
| 6,507,336 B1 | 1/2003 | Lunsford | |
| D472,225 S | 3/2003 | Griffin | |
| 6,535,749 B1 | 3/2003 | Iwata et al. | |
| 6,538,651 B1 | 3/2003 | Haymann et al. | |
| D472,551 S | 4/2003 | Griffin | |
| D473,226 S | 4/2003 | Griffin et al. | |
| D476,985 S | 7/2003 | Griffin | |
| D478,585 S | 8/2003 | Griffin | |
| 6,608,616 B2 | 8/2003 | Lin et al. | |
| 6,611,254 B1 | 8/2003 | Griffin et al. | |
| 6,611,255 B2 | 8/2003 | Griffin et al. | |
| D479,233 S | 9/2003 | Griffin | |
| D479,714 S | 9/2003 | Donner | |
| D480,722 S | 10/2003 | Griffin | |
| 6,630,924 B1 | 10/2003 | Peck et al. | |
| D482,353 S | 11/2003 | Helin | |
| 6,647,367 B2 | 11/2003 | McArthur et al. | |
| 6,731,227 B2 | 5/2004 | Horie | |
| 6,744,890 B1 | 6/2004 | Le et al. | |
| 6,842,169 B2 * | 1/2005 | Griffin et al. | 345/163 |
| 7,319,461 B2 * | 1/2008 | Griffin et al. | 345/184 |
| 7,495,660 B2 * | 2/2009 | Griffin et al. | 345/184 |
| 7,639,241 B2 * | 12/2009 | Griffin et al. | 345/184 |
| 2001/0044828 A1 | 11/2001 | Kikinis | |
| 2002/0054676 A1 | 5/2002 | Zhao et al. | |
| 2002/0158844 A1 * | 10/2002 | McLoone et al. | 345/163 |
| 2003/0006968 A1 | 1/2003 | Solomon | |
| 2003/0025673 A1 * | 2/2003 | Ledbetter et al. | 345/163 |

FOREIGN PATENT DOCUMENTS

| | | |
|---|---|---|
| EP | 0278169 A2 | 8/1988 |
| EP | 0538020 A1 | 4/1993 |
| EP | 0685801 A1 | 12/1995 |
| EP | 0732646 A2 | 9/1996 |
| EP | 0760291 | 3/1997 |
| EP | 1143327 A1 | 10/2001 |
| WO | 96/04618 A1 | 2/1996 |
| WO | 9833111 A1 | 7/1998 |
| WO | 9937025 A1 | 7/1999 |
| WO | 00/30381 A1 | 5/2000 |
| WO | 0038041 A1 | 6/2000 |
| WO | 00/74240 A1 | 12/2000 |
| WO | 0150335 A1 | 7/2001 |

* cited by examiner

HAND-HELD ELECTRONIC DEVICE WITH MULTIPLE INPUT MODE THUMBWHEEL

CROSS-REFERENCE TO RELATED APPLICATION

This application is a continuation of U.S. patent application Ser. No. 12/354,674, filed on Jan. 15, 2009, which is a continuation of U.S. patent application Ser. No. 11/950,234, filed on Dec. 4, 2007, now U.S. Pat. No. 7,495,660, which is a continuation of U.S. patent application Ser. No. 10/997,340, filed on Nov. 24, 2004, now U.S. Pat. No. 7,319,461, which is a continuation of U.S. patent application Ser. No. 10/038,314, filed on Oct. 19, 2001, now U.S. Pat. No. 6,842,169. These prior applications, including their entire written descriptions and drawing figures, are hereby incorporated into the present application by reference.

BACKGROUND OF THE INVENTION

1. Field of the Invention

This invention relates to handheld electronic devices ("mobile devices") having an auxiliary input device. Specifically this invention relates to auxiliary input devices such as multiple input mode thumbwheels.

2. Description of the Prior Art

In most mobile devices with a thumbwheel input, the thumbwheel is oriented so that the thumbwheel would be accessed on a horizontal axis or a vertical axis to the mobile device's housing. A horizontal orientation of a thumbwheel, in relation to the device housing, takes up significant space on the printed circuit board of the device (herein referred to as PCB). A vertical orientation of a thumbwheel, in relation to the device housing adds significant overall thickness to the device and device housing or undesirable protrusion from the housing.

SUMMARY OF THE INVENTION

It is an object of the invention to provide a thumbwheel input device characterized by a wheel having a first axis of rotation whereby a first input is generated by rotation of the wheel about the first axis, and a holder having a second axis of rotation and a portion thereon to receive the wheel whereby a second input is generated by rotation of the holder about the second axis.

In one aspect of the invention, a mobile device includes a thumbwheel as an embodiment of an auxiliary input device. In most mobile devices with a thumbwheel input, the thumbwheel is oriented so that the thumbwheel would be accessed on a horizontal axis or a vertical axis to the mobile device's housing. In this embodiment of the device, the thumbwheel is oriented on an incline from the vertical in order to maximize PCB real estate. Orienting the thumbwheel on an incline will optimize the amount of space on the PCB and the thickness of the device housing.

Further features of the invention will be described or will become apparent in the course of the following detailed description.

BRIEF DESCRIPTION OF THE DRAWINGS

In order that the invention may be more clearly understood, the one or more embodiments thereof will now be described in detail by way of example, with reference to the accompanying drawings, in which.

DETAILED DESCRIPTION OF THE PREFERRED EMBODIMENT

Figure 1:
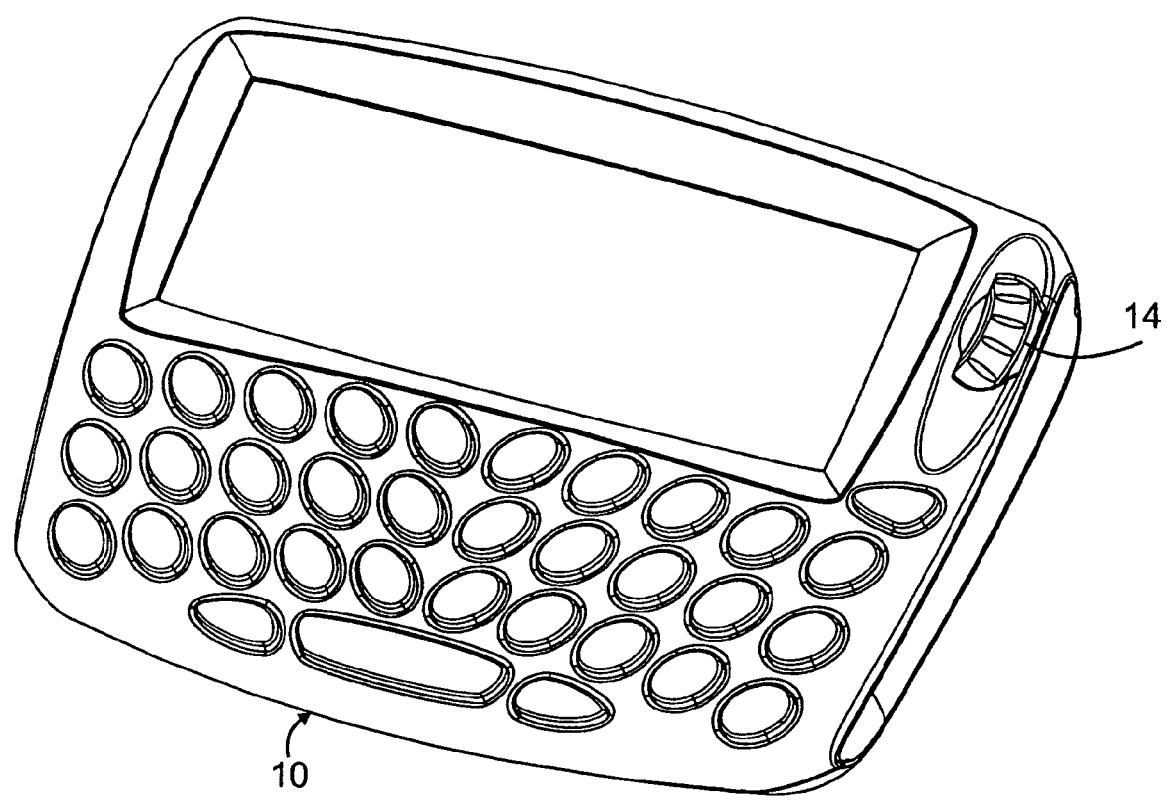
FIG. 1 is a top view of the device with a multiple input mode thumbwheel.

FIG. 1 is a top view of an embodiment of the device with a multiple input mode thumbwheel. In this embodiment, the thumbwheel 12 is displaced on an incline from the vertical of the face of the mobile device housing 10. The wheel 14 protrudes through the device housing 10.

Figure 2:
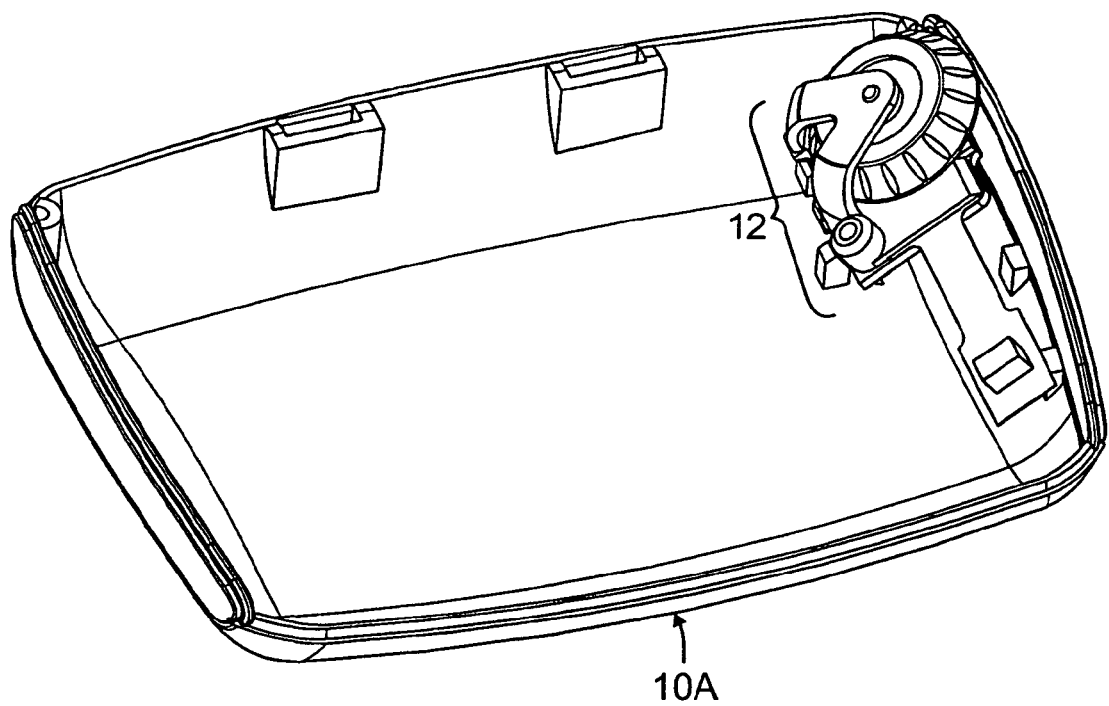
FIG. 2 is a cut-away view of the device showing the location of the thumbwheel.

FIG. 2 is a cut-away view of the device showing a preferred location of the thumbwheel 12. The PCB and other associated components that cooperate with the thumbwheel 12 receive and react to input provided via the thumbwheel is not shown. This drawing shows the bottom 10A of the device housing and the placement of the thumbwheel 12 assembly within the housing.

Figure 3:
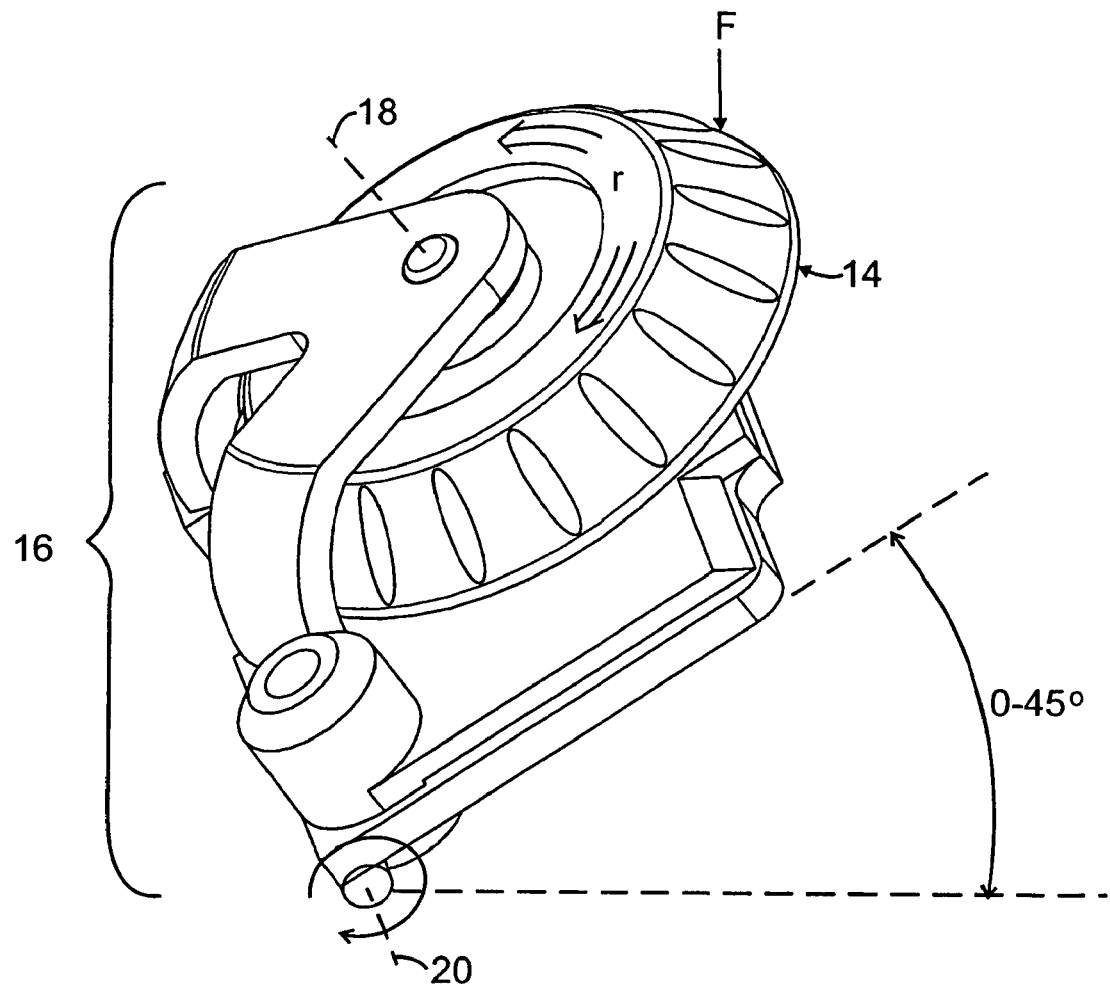
FIG. 3 is a detailed diagram of the top of the thumbwheel assembly describing the modes of movement of the thumbwheel.

FIG. 3 is a detailed diagram of the top view of the thumbwheel assembly describing the modes of movement of the thumbwheel. In this embodiment, the wheel 14 sits in the holder 16, which is oriented on an angle from the horizontal plane 19 of the device housing 10. In a preferred embodiment, this angle may be within a range of 0 to 45 degrees from the horizontal plane 19 to provide optimum space for PCB and PCB components, to reduce overall thickness of the device housing 10, and to be optimized for use with the user's thumbs.

The user may make inputs with the thumbwheel by rotating in clockwise or counter-clockwise the wheel 14 around the thumbwheel's axis of rotation 18, as illustrated by the rotation r, or by pressing down on the wheel, as illustrated by force F. In traditionally oriented thumbwheel inputs, the thumbwheel is pressed down toward the back of the device. Because the thumbwheel assembly is tilted on an angle in this embodiment, a second axis of rotation 20 exists along the bottom of the thumbwheel assembly 12. When the user presses the exposed part of the wheel 14 from a first position, down toward the back of the device onto, the thumbwheel 12 translates to a second position approximately 0.5 mm downward. This motion of pressing downward onto the thumbwheel causes the thumbwheel to rotate around the second axis of rotation 20 in a rocking or seesaw motion, as illustrated by the rotation R. The movement of the thumbwheel in this direction is limited by the thumbwheel holder 16 and the device housing 10.

Figure 4:
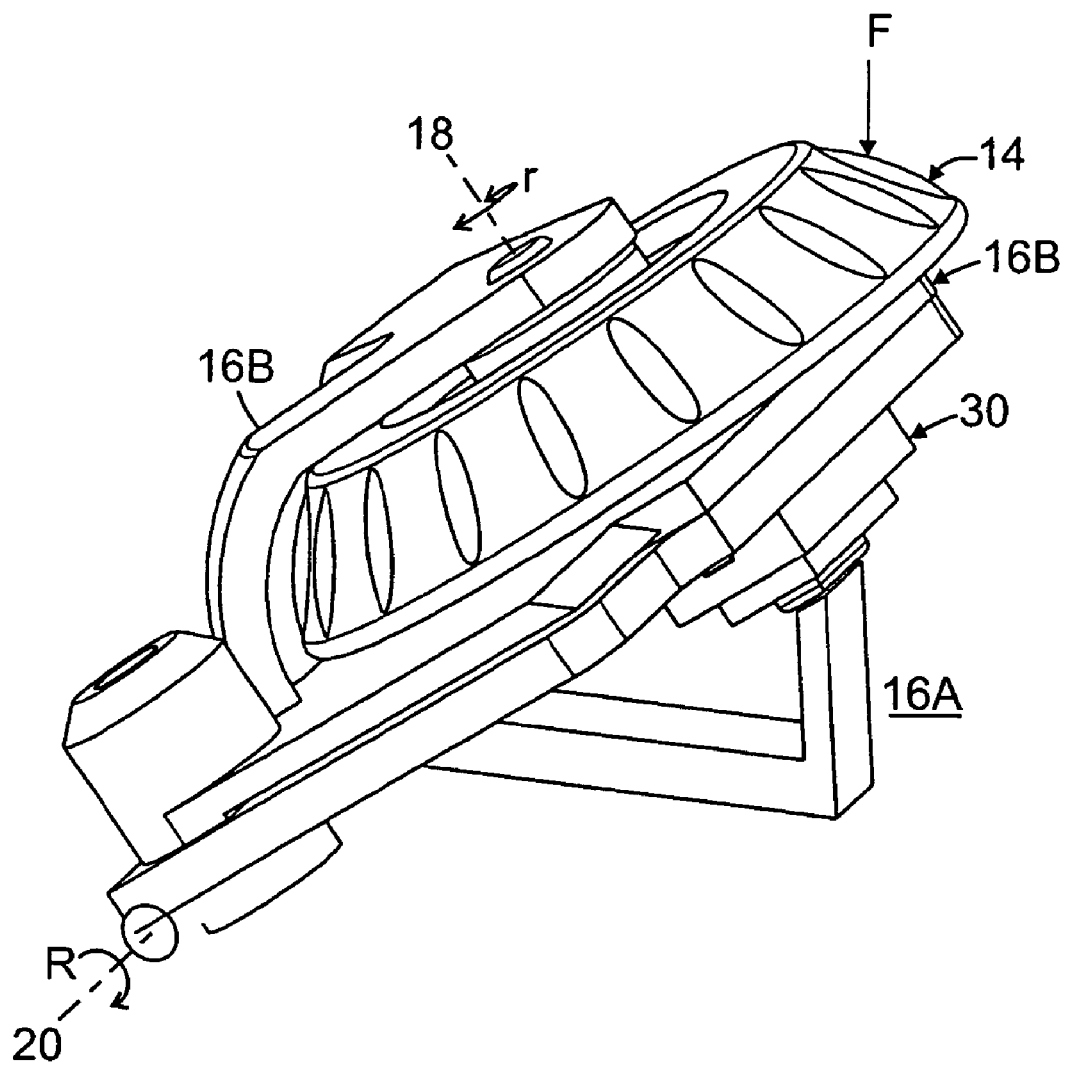
FIG. 4 is a side view of the thumbwheel assembly.

FIG. 4 is a side view of the thumbwheel assembly. This view shows the bottom of the thumbwheel holder 16. An arm 16A, comprising a base portion and an arm portion, extends around the bottom of the assembly towards the holder for the purpose of engaging the bottom of the holder 16 and activating an input. Between the arm 16A and the holder 16 is a tactile switch 30. When the user presses down on the exposed part of the wheel, the wheel 14 is stopped by the arm 16A of the holder 16 and the tactile switch 30. The tactile switch 30 is thus activated, receiving an input and the arm 16A acts as a stop. The tactile switch 30 may be either attached to the bottom of the holder to engage the arm, or it may be attached to the arm to engage the bottom of the holder.

A further embodiment of the invention would be to eliminate the arm on the holder. In this example, part of the device housing may be used to perform the stop function of the arm. The device housing may have a protrusion on which the assembly may sit so that the tactile switch may be attached to the protrusion or if the tactile switch is on the bottom of the assembly, it may engage the protrusion.

Figure 5:
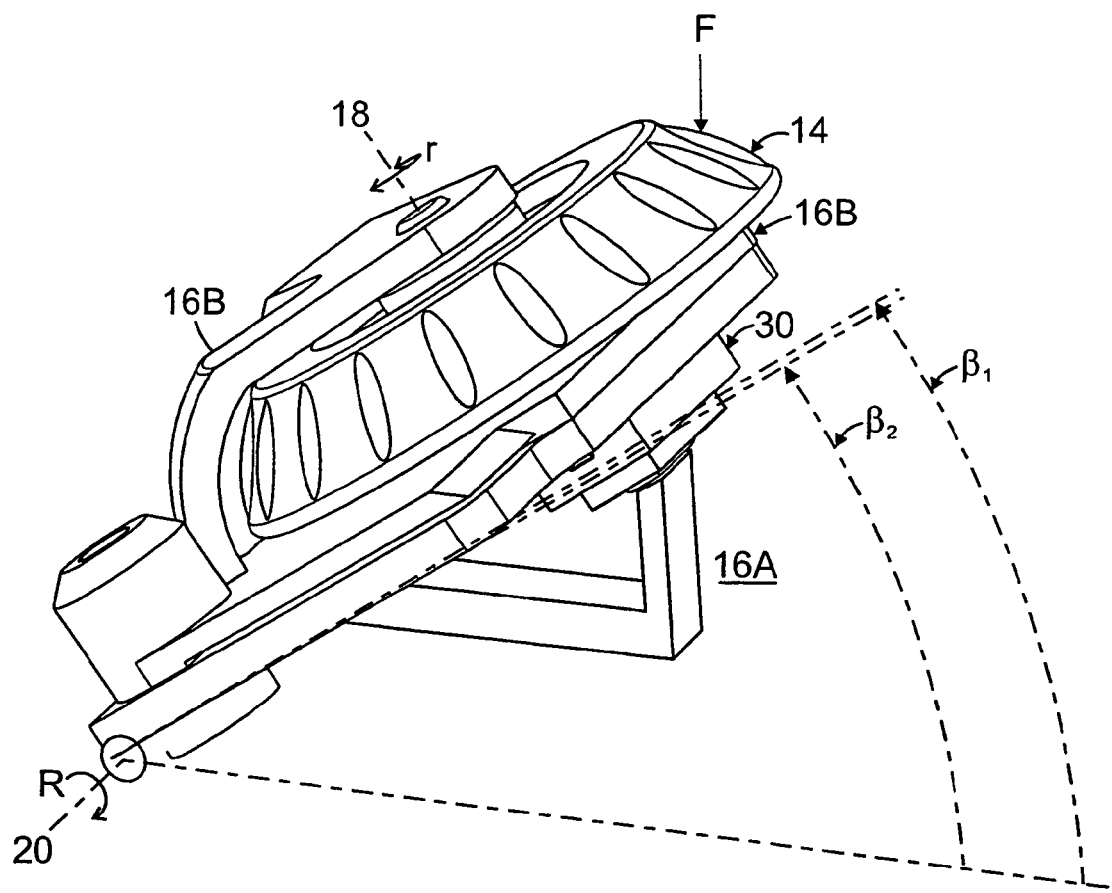
FIG. 5 shows the translation of the thumbwheel assembly from a first position to a second position.

FIG. 5 shows the translation of the thumbwheel assembly from a first position to a second position. When the user presses down on the wheel 14 in the direction of F, the thumbwheel assembly 12 moves from a first position $\beta_1$ to a second position $\beta_2$ around the second axis of rotation 20. When the user releases the wheel 14, the thumbwheel assembly 12 returns to the first position $\beta_1$. The translation in the direction of the force F is such that the thumbwheel assembly 12 will engage the tactile switch 30 to detect or receive an input.

Figure 6:
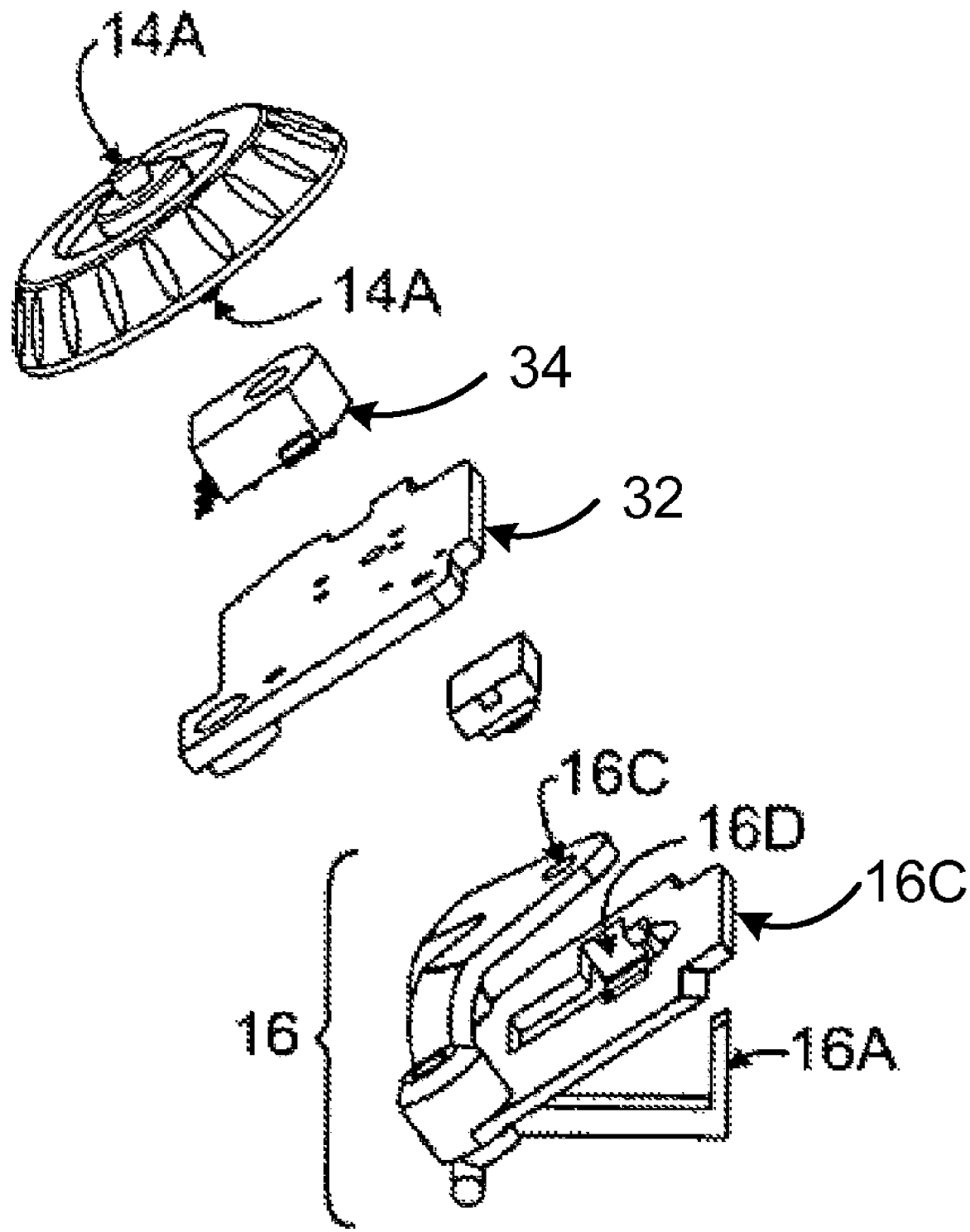
FIG. 6 is an exploded view of the thumbwheel assembly detailing the components of the thumbwheel assembly.

FIG. 6 is an exploded view of the thumbwheel assembly. The wheel 14 sits on a rotating encoder switch 34 such that the lower axle 14A of the wheel 14 sits in a recess on the rotating encoder switch 34 allowing the wheel to rotate around its axis of rotation 18. This switch detects inputs to the device whenever the wheel is rotated around the wheel's axis of rotation 18. This switch is attached to the thumbwheel assembly PCB 32. The thumbwheel assembly PCB 32 attaches to the device PCB by a flex circuit (not shown in this view). These parts fit into the thumbwheel holder 16 such that the wheel 14 and the rotatable encoder switch 34 is supported by a U-shaped bracket 16B. The upper axle 14A of the wheel fits into the provided aperture 16C in the upper bracket of the U-shaped bracket 16B and the rotatable encoder 34 switch fits into the provided indentation 16D in the lower bracket of the U-shaped bracket 16B. The rotatable encoder switch 34 attaches to the thumbwheel assembly PCB 32, which is placed on the under side of the lower bracket of the U-shaped bracket 16B. The thumbwheel assembly PCB 32 is in contact with the tactile switch 30 on the opposite side of this PCB than the rotatable encoder switch 34. The tactile switch engages the holder arm 16A in order to limit the movement of the thumbwheel about the holder's axis of rotation 20.

Figure 7:
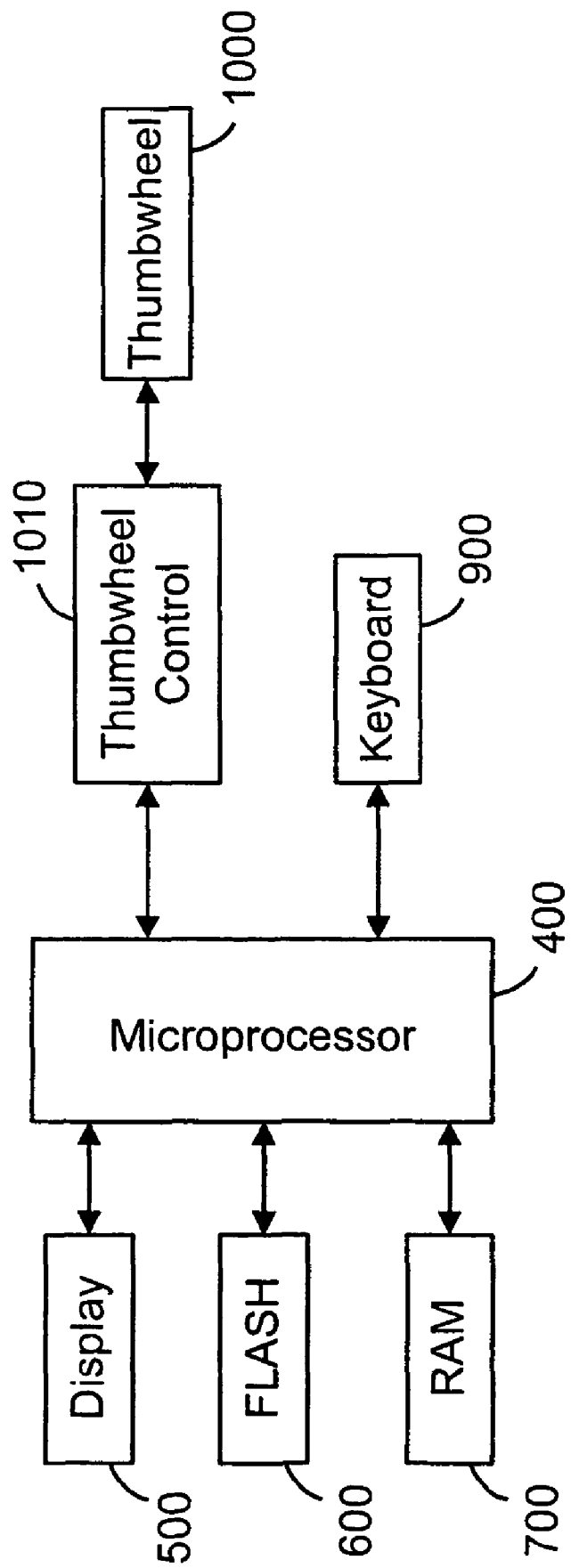
FIG. 7 is a block drawing for the thumbwheel input for a handheld electronic device.

FIG. 7 is a general block diagram depicting the inputs of a typical handheld electronic device. A typical handheld electronic device would usually include a microprocessor 400 that controls the components of the device such as a display, FLASH memory 600, RAM 700, and inputs in the form of a keyboard 900, and an auxiliary input such as a thumbwheel 1000 which would include thumbwheel control logic 1010.

Figure 8:
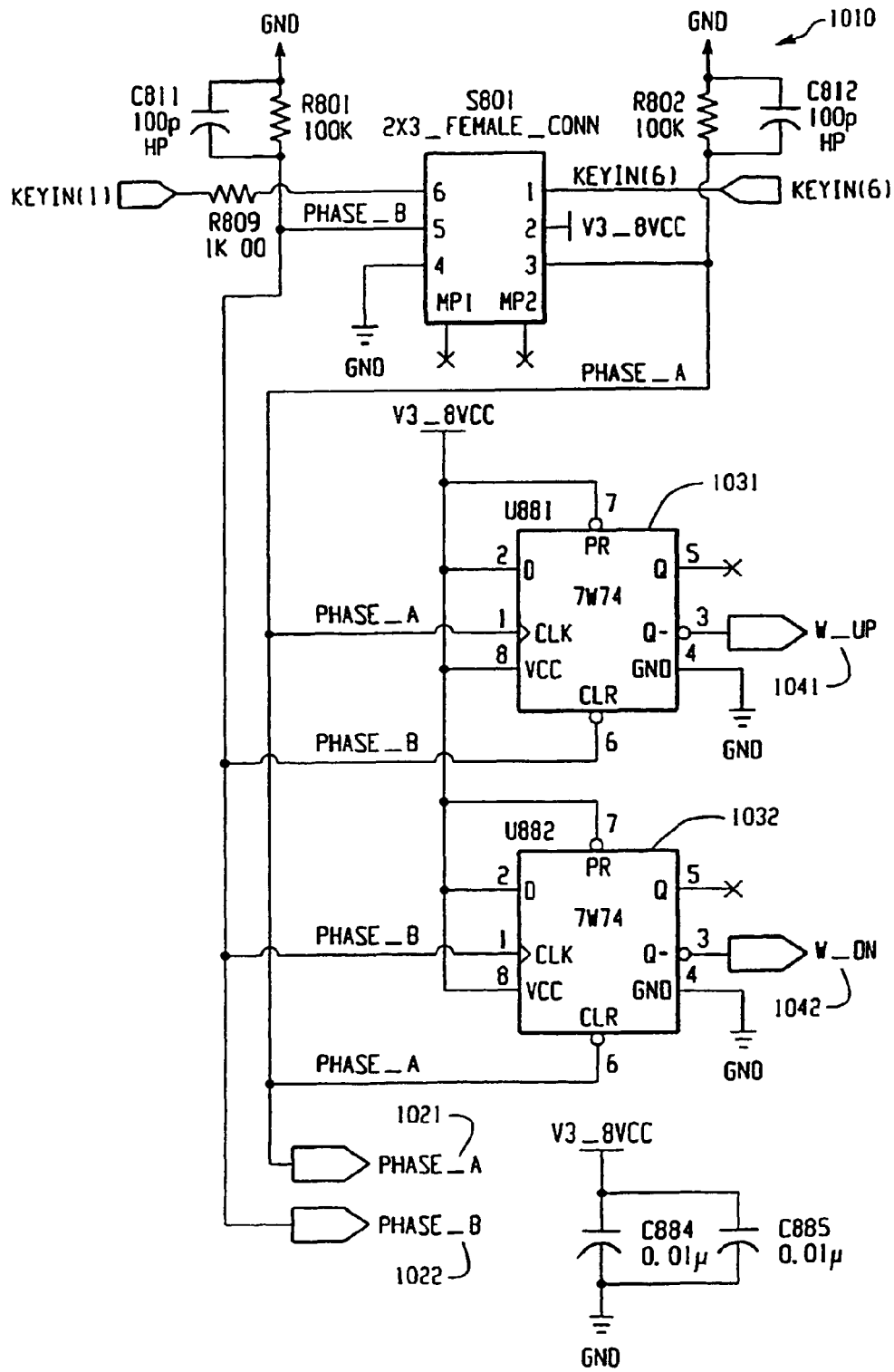
FIG. 8 is a typical example of a circuit for a thumbwheel input.

FIG. 8 is an example of typical logic circuitry 1010 associated with thumbwheel 1000. This diagram is meant for example purposes only and as one skilled in the art would understand, logic circuitry for a thumbwheel is not limited to this example. Thumbwheel 1000 outputs quadrature signals phase A 1021 and phase B 1022, which are processed by D flip-flops 1031 and 1032 to present signals 1041 W_UP and 1042 W_DN to microprocessor 400. Signals 1041 and 1042 represent, respectively, a user rolling the thumbwheel up and rolling the thumbwheel down. Preferably, another detectable input movement from the thumbwheel is desirable. One such input movement implementation would produce an additional input signal derived from pushing the thumbwheel toward the rear of the device. Hence, the thumbwheel of the present invention has preferably measurable rotatable and depressible input movements. Although the description that follows is specifically relating to a thumbwheel input device, it is to be understood that other suitable thumb-based auxiliary input devices having multiple input detectable movements are envisioned and well within the scope and spirit of the present invention.

Another embodiment of this circuitry may have the functionality of the D flip-flops 1031 and 1032 embedded within the processor.

It will be appreciated that the above description relates to the preferred embodiment by way of example only. Many variations on the invention will be obvious to those knowledgeable in the field, and such obvious variations are within the scope of the invention as described and claimed, whether or not expressly described.

We claim:

1. An input apparatus for a mobile device having a device housing, said input apparatus comprising:
    a rotary switch configured to detect a first rotary input representative of input rotation about a first rotation axis; and
    a holder supported at the device housing and configured to hold said rotary switch, said holder rotatable about a second rotation axis responsive to a second rotary input and oriented at an incline relative to a vertical axis of the device housing.

2. The input apparatus of claim 1 further comprising a wheel positionable to sit upon said rotary switch, rotation of said wheel forming the input rotation about the first rotation axis.

3. The input apparatus of claim 2 wherein said wheel is permitted rotation in any of a clockwise direction and a counter-clockwise direction.

4. The input apparatus of claim 1 further comprising a second switch supported at said holder, said second switch configured to detect the second rotary input.

5. The input apparatus of claim 4 wherein said second switch comprises a tactile switch.

6. The input apparatus of claim 4 wherein said holder comprises a bracket, said bracket configured to hold said rotary switch.

7. The input apparatus of claim 6 wherein said holder further comprises an arm configured to support said second switch, said arm and said second switch positioned beneath said bracket.

8. The input apparatus of claim 1 wherein said holder is configured to be rotatable between a first position and a second position.

9. The input apparatus of claim 8 wherein rotation of said holder between the first position and the second position comprises a rocking motion there between.

10. The input apparatus of claim 1 wherein said holder comprises a bracket, said bracket configured to hold said rotary switch.

11. The input apparatus of claim 1 further comprising control logic configured to receive indications of detection of the first rotary input.

12. The input apparatus of claim 11 wherein said control logic is configured to generate a first signal representative of input rotation in a first direction and to generate a second signal representative of input rotation in a second direction.

13. The input apparatus of claim 1 wherein said holder is oriented on an angle from a horizontal plane of the device housing.

14. The input apparatus of claim 1 wherein rotation of said holder about the second rotation axis provides for a seesaw movement of said holder.

15. A method for facilitating multiple inputs by way of a thumb input device of a mobile device, said method comprising:
- detecting a first rotary input representative of a first input rotation about a first rotation axis at the thumb input device;
- detecting a second rotary input representative of a second input rotation about a second rotation axis at the thumb input device the first rotation axis dissimilar to the second rotation axis; and
- providing indication of detection of the first rotary input and of detection of the second rotary input to a thumb input controller.

16. The method of claim 15 wherein said detecting the first rotary input comprises detecting rotation of a thumbwheel about the first rotation axis.

17. The method of claim 15 wherein the thumbwheel is held by a holder, the holder rotatable about the second rotation axis and wherein said detecting the second rotary input comprises rotation of the holder.

18. The method of claim 15 wherein the first input rotation about the first rotation axis comprises rotation in any of a clockwise direction and a counter-clockwise direction.

19. The method of claim 15 wherein the second input rotation about the second rotation axis comprises rotation between a first position and a second position.

20. The method of claim 19 wherein the second rotary input detected during said detecting the second rotary input comprises detecting rotation of the holder to the second position.

* * * * *

UNITED STATES PATENT AND TRADEMARK OFFICE
CERTIFICATE OF CORRECTION

PATENT NO. : 7,952,571 B2
APPLICATION NO. : 12/636192
DATED : May 31, 2011
INVENTOR(S) : Jason T. Griffin et al.

It is certified that error appears in the above-identified patent and that said Letters Patent is hereby corrected as shown below:

In column 2, line 12, after "device;", insert --and--.

In column 2, line 25, "The PCB" should read --How the PCB--.

In column 2, line 27, after "thumbwheel", insert --12--.

In column 2, line 28, after "device housing", insert --10--.

In column 2, line 29, "thumbwheel 12 assembly" should read --thumbwheel assembly 12--.

In column 2, line 30, "housing." should read --housing 10.--.

In column 2, lines 31-32, after "thumbwheel assembly", insert --12--.

In column 2, line 33, "thumbwheel." should read --thumbwheel 12.--.

In column 2, lines 41-42, "thumbwheel by rotating in clockwise" should read --thumbwheel 12 by rotating clockwise--.

In column 2, line 43, "thumbwheel's axis" should read --thumbwheel 12's axis--.

In column 2, line 44, "wheel," should read --wheel 14,--.

In column 2, line 47, after "thumbwheel assembly", insert --12--.

In column 2, line 53, after "thumbwheel", insert --12--.

In column 2, line 54, after "thumbwheel", insert --12--.

In column 2, line 56, after "thumbwheel", insert --12--.

In column 2, line 59, "thumbwheel assembly." should read --thumbwheel assembly 12.--.

In column 2, line 66, "wheel," should read --wheel 14,--.

In column 3, line 3, "holder to engage the arm," should read --holder 16 to engage the arm 16A,--.

In column 3, line 4, after "arm", insert --16A--; and "holder." should read --holder 16.--.

In column 3, line 12, after "thumbwheel assembly", insert --12--.

Signed and Sealed this
Twentieth Day of December, 2011

David J. Kappos
*Director of the United States Patent and Trademark Office*

CERTIFICATE OF CORRECTION (continued)

U.S. Pat. No. 7,952,571 B2

In column 3, line 21, "thumbwheel assembly." should read --thumbwheel assembly 12.--.

In column 3, line 24, after "wheel", insert --14--.

In column 3, line 26, "wheel is rotated around the wheel's axis" should read --wheel 14 is rotated around the wheel 14's axis--.

In column 3, line 31, "is supported" should read --are supported--.

In column 3, line 32, after "wheel", insert --14--.

In column 3, line 41, after "tactile switch", insert --30--.

In column 3, line 43, after "thumbwheel", insert --12--.

In column 3, line 59, after "thumbwheel", insert --1000--.

In column 3, line 60, after "thumbwheel", insert --1000--.

In column 3, line 61, after "thumbwheel", insert --1000--.

In column 3, line 63, after "thumbwheel", insert --1000--.

In column 3, line 64, after "thumbwheel", insert --1000--.

In claim 15, column 5, line 9, "device the first" should read --device, the first--.